UNITED STATES PATENT OFFICE.

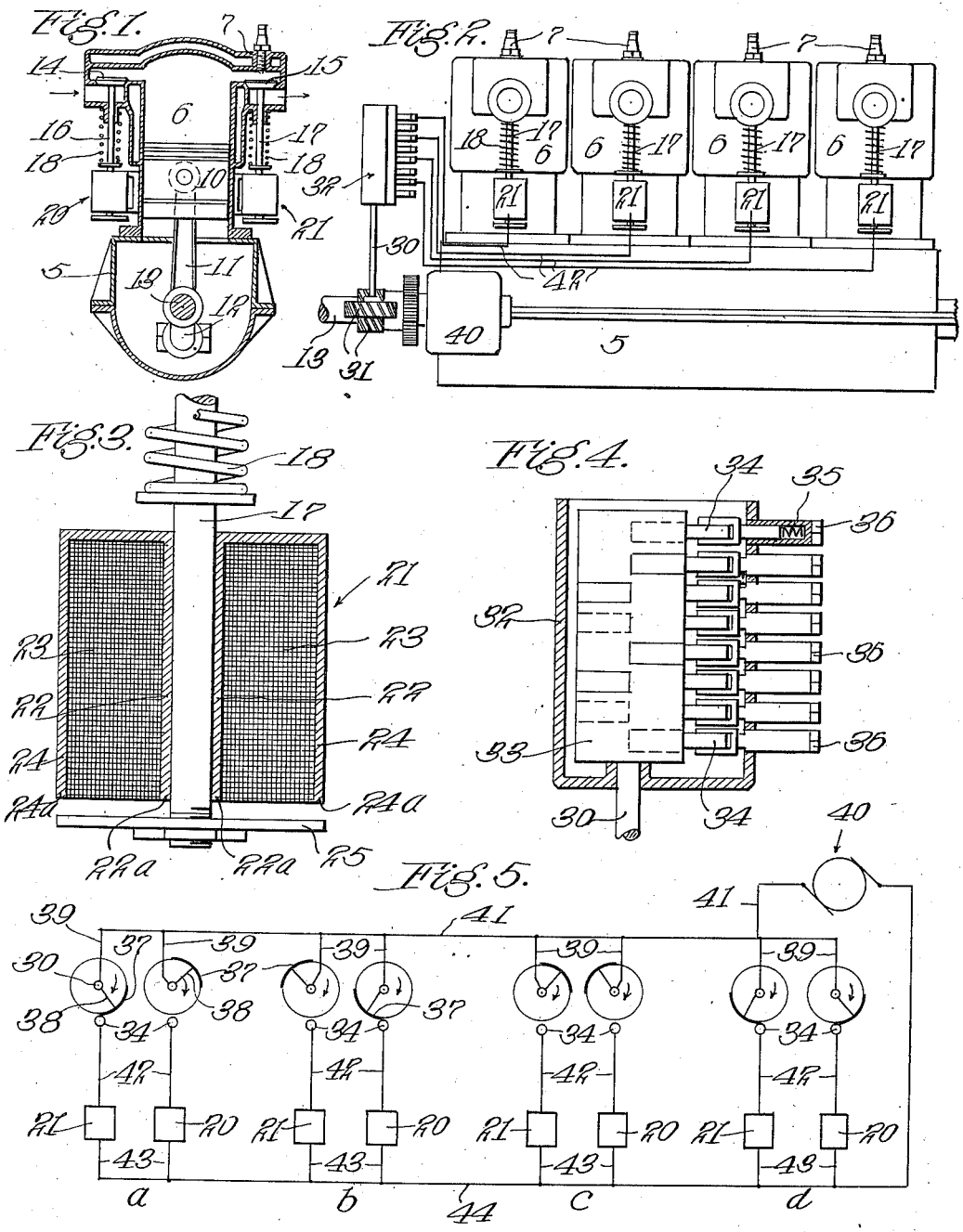

ORLANDO E. KELLUM, OF LOS ANGELES, CALIFORNIA.

VALVE MECHANISM FOR AUTOMOBILE-ENGINES AND THE LIKE.

1,038,598.   Specification of Letters Patent.   Patented Sept. 17, 1912.

Application filed July 29, 1911. Serial No. 641,265.

*To all whom it may concern:*

Be it known that I, ORLANDO E. KELLUM, a citizen of the United States, residing at Los Angeles, in the county of Los Angeles, State of California, have invented new and useful Improvements in Valve Mechanisms for Automobile-Engines and the Like, of which the following is a specification.

This invention relates to improvements in internal combustion engines for any use, although I anticipate that it will be especially useful in automobiles for reasons which will be hereinafter set forth; and the invention consists specifically in an improved valve mechanism and method of operation which does away with all the usual cams, cam shaft and gears, cam followers and tappets, and all other accompanying parts, and obviates all of the wear and noise attendant on such parts. In a four or six cylinder engine the number of parts involved in the cam action is excessive, in some cases amounting to about half the engine mechanism; and the wear of these parts is the most serious in the engine.

One of the main objects of my invention is to provide a simple construction which will do away with the complicated mechanical structures heretofore used for operating the puppet valves of an internal combustion engine; and also to produce a device which will cause the more accurate operation of the valves—that is, cause the valves to be opened and closed more accurately at the desired instants during the cycles of operations of the engine, and also cause them to open and close very quickly. It is an inherent condition of a cam operated movement that it be comparatively slow and gradual. It is utterly impossible in such a mechanism to obtain a quick movement of any of the parts without moving the cam itself at a high speed of rotation. The result of use of this mechanical combination in internal combustion engines has been the gradual opening and closing of the inlet and exhaust valves, in spite of the fact that it is universally recognized that ideal conditions demand the quick opening and quick closing of the valves.

My invention consists specifically in a novel and simple form of electro-magnetic operated valve; each puppet valve having an electro-magnet whose action raises the valve off its seat. Each of these electro-magnetic devices is supplied with current through a timer mechanism which is rotatively connected with the shaft or any other moving or rotating part of the engine. With the timer and connections properly arranged, each of the electro-magnetic devices is energized at the proper instants and throughout the proper interval to raise its corresponding valves just as desired. The energy for the electric operation may be supplied from a small dynamo driven directly from the engine—such a dynamo as is now in use for charging the storage batteries and for operating the lights of automobiles.

In the accompanying drawings I have illustrated a typical form of my invention as applied to a four-cylinder gas engine of the four-cycle type. It will be understood, however, that the invention may be applied to any form of engine in which valves of the character shown are used; an engine operated by steam or compressed air may be equipped with my invention and the results be just as satisfactory as an internal combustion engine.

In the accompanying drawings: Figure 1 is a vertical cross section of a typical engine equipped with my invention. Fig. 2 is a side elevation of the same. Fig. 3 is an enlarged section showing the electro-magnetic device for operating the individual valves. Fig. 4 is a detail section illustrating a typical form of timer. Fig. 5 is a diagrammatic view illustrating typical electrical connections of the different parts for operating the valves.

In the drawings 5 designates the crank case of an engine on which cylinders 6 are mounted in the usual manner. Cylinders 6 are provided with the usual appurtenances common to internal combustion engines, having the usual water jackets and spark plugs 7. Although the engine must necessarily have an ignition system in connection with its spark plugs, it will be understood that I do not enter into the particulars of such a system as it has no direct bearing on my present invention. Other minor features of the engine will also be left unexplained, being common to engines of this character.

Each of cylinders 6 is provided with the usual piston 10 which is connected by connecting rod 11 to crank 12 of engine shaft 13. Each of the cylinders is also provided with an inlet valve 14 and an exhaust valve 15 mounted on valve stems 16 and 17 respectively. These valves are of the ordinary puppet type. Springs 18 tend to keep the valves down on their seats, the valves opening upwardly in the construction illustrated. However, it will be understood that these valves may open in any direction and may be situated in any position relative to the cylinder; I have merely shown the present arrangement as it is particularly adapted to a clear showing of my invention. At the lower end of each of valve stems 16 and 17 is mounted an electro-magnetic device 20 or 21. These devices are constructed as is illustrated in detail in Fig. 3. Valve stem 17 projects downwardly through the center of an electro-magnet whose core 22 is hollow for the passage of the stem. The valve stem may be made of some non-magnetic material. The winding of the electro-magnet is represented at 23 and a magnetic casing 24 surrounds the winding, the magnetic path being complete through the electro-magnet from the point 24$^a$ to the point 22$^a$. A flat disk armature 25 is provided on the lower end of the valve stem, means being provided for adjusting the disk in position, and is attractable by the electro-magnet when energized. It is designed that the movement of the armature shall be just sufficient to raise the valves the required distance to open them to their full capacity. The casings 24 are mounted rigidly upon some portion of the engine frame so as to be relatively immovable.

In Fig. 4 I have shown a typical form of timer which I may use in my invention; but I do not wish to restrict myself to this exact form, as any other form will suffice which will cause the closures of the electric circuits at the desired intervals. I have shown a timer shaft 30 connected by gears 31 to shaft 13 of the engine, and in this case the timer shaft is so arranged as to rotate one revolution to every two revolutions of the engine shaft. This particular arrangement is for a four-cycle engine, each of the valves being raised once every two revolutions of the engine shaft. The timer itself is comprised in a casing 32 carrying a series of contacts, eight in number in this particular case, and a rotating member 33 which carries a series of commutator segments adapted to be engaged by these contacts. Each of the contacts is comprised in a roller 34 mounted so as to be spring pressed by a spring 35 into engagement with member 33 and the commutator segment thereon. Binding posts 36 provide means for connection with wires leading to the electro-magnetic devices.

In Fig. 5 I have shown diagrammatically the connections between the various parts of the mechanism. I have shown a small generator 40, which may be operated directly from the engine, and which will supply the current needed for the actuation of the electro-magnetic device. In Fig. 5 I have shown the commutator segments of the timer arranged in pairs, the segments of each pair corresponding to the inlet and exhaust valves of a single cylinder. These segments I have designated as 37 and have shown them connected by short wires 38 to shaft 30 from whence lead wires 39 to a main trunk wire 41 which leads to one side of generator 40. Each of rollers 34 is connected by a wire 42 with one of electro-magnetic devices 20 or 21 and each of the electro-magnetic devices is connected by a wire 43 to a trunk wire 44 which leads to the other side of generator 40. The arrangement of segments 37 on rotating member 33 will be entirely determined by the sequence of operation in the different cylinders; but I have shown these segments arranged for a typical sequence of explosion in the cylinders; and in Fig. 5 I have shown the segments in their proper relative position for this particular sequence. Supposing that the segments are rotating in the direction indicated by the arrows, it will be seen that one of segments 37 of the set designated $a$ is just coming into contact with roller 34 and is just causing closure of connection with magnetic device 21. This magnetic device will immediately act to open exhaust valve 15 to which it is connected. This exhaust valve will remain open during a quarter revolution of the timer, or during a half revolution of the engine shaft, and will then close; and immediately upon the closure of the exhaust valve the other segment 37 of this particular set will engage with its contact roller 34 and will similarly cause the opening of the inlet valve. This operation will be followed for sets $c$, $b$ and $d$ in the order named; and it will be seen that this operation of the valves is one which is ordinarily used for automobile engines.

One of the main advantages of my electro-magnetic action is the precision with which the valves may be adjusted as to opening and closing and the speed at which they open and close. As hereinbefore pointed out, it is the essence of a cam movement that it be gradual; while it is the essence of a magnetic movement that it be very quick. When current is supplied to any one of the magnetic devices, the valve connected to that device is immediately opened to its full extent, and it is not closed again until the end of its proper cycle is reached, when it is allowed to close as quickly as its spring 18 may act. In the ordinary cam operated valve action the cycle during which the valve should be opened is greatly spent before the valve is fully opened, and in order to be completely closed at the end of the cycle the valve must begin closing at a considerable interval before the end. Moreover, where cams and followers are used it is almost impossible to keep the different parts in such fine adjustment as to always open and close the valves exactly when desired. In my device the adjustment may be very fine—the valves may be made to open accurately at pre-determined points in the cycle of operation.

Having described my invention, I claim:

A valve mechanism, comprising a seat, a puppet valve adapted to seat thereon, a valve stem connected to the valve, a spring arranged around the valve stem to hold it on the seat, a hollow electro-magnet through which the valve stem passes, and an armature on the end of the valve stem and attractable by the electro-magnet to lift the valve off its seat.

In witness that I claim the foregoing I have hereunto subscribed my name this 22 day of July 1911.

ORLANDO E. KELLUM.

Witnesses:
 JAMES T. BARKELEW,
 BESSIE McMORDIE.